United States Patent
Song et al.

(10) Patent No.: US 7,746,087 B2
(45) Date of Patent: Jun. 29, 2010

(54) HEATING-CONTROL ISOLATION-DIODE TEMPERATURE-COMPENSATION

(75) Inventors: Qun Song, Sunnyvale, CA (US); Qi Wang, Shanghai (CN); Fang Xie, Shanghai (CN); De-Song Huang, Shanghai (CN); Qi Xu, Shanghai (CN)

(73) Assignee: Pericom Technology Inc., Shanghai (CN)

( * ) Notice: Subject to any disclaimer, the term of this patent is extended or adjusted under 35 U.S.C. 154(b) by 144 days.

(21) Appl. No.: 11/777,719

(22) Filed: Jul. 13, 2007

(65) Prior Publication Data

US 2009/0015316 A1   Jan. 15, 2009

(51) Int. Cl.
*G01K 7/00* (2006.01)
*G01K 1/00* (2006.01)
*H01L 35/00* (2006.01)

(52) U.S. Cl. .............. 324/720; 374/170; 374/178; 327/512; 327/513; 702/130

(58) Field of Classification Search .......... 324/720, 324/105, 721; 374/170, 178; 327/512, 513; 702/130–136

See application file for complete search history.

(56) References Cited

U.S. PATENT DOCUMENTS

| | | | |
|---|---|---|---|
| 3,882,728 A * | 5/1975 | Wittlinger | 374/112 |
| 4,393,300 A * | 7/1983 | Proctor | 219/497 |
| 5,072,879 A * | 12/1991 | Noye | 237/8 R |
| 5,563,760 A * | 10/1996 | Lowis et al. | 361/103 |
| 6,342,997 B1 * | 1/2002 | Khadkikar et al. | 361/103 |
| 6,366,099 B1 * | 4/2002 | Reddi | 324/678 |
| 6,441,350 B1 * | 8/2002 | Stoddard et al. | 219/497 |
| 6,836,081 B2 * | 12/2004 | Swanson et al. | 315/307 |
| 2005/0074051 A1 * | 4/2005 | Won et al. | 374/170 |

* cited by examiner

*Primary Examiner*—Timothy J Dole
*Assistant Examiner*—Farhana Hoque
(74) *Attorney, Agent, or Firm*—Stuart T. Auvinen; g Patent LLC (57) ABSTRACT

A semiconductor integrated circuit (IC) acts as a controller of a heating-controlled device or appliance. A heating body has a positive temperature coefficient and acts as both a heating element and a temperature sensor. A Silicon-Controlled Rectifier (SCR) switches AC current to the heating body to increase its temperature. When the SCR switches off, temperature sensing is performed using a sampling resistor, isolation diode, voltage comparator, and switch for a low-voltage DC supply are formed on an integrated circuit that has a first circuit branch and a second circuit branch. A compensation diode and a compensation resistor can be added in parallel to reference resistors. The compensation diode compensates for the forward voltage drop of the isolation diode that would otherwise create an inaccurate temperature measurement. The diodes have the same temperature response, allowing for a more accurate temperature measurement over a full temperature range of the sensorless appliance.

20 Claims, 6 Drawing Sheets

HEATING-CONTROL ISOLATION-DIODE TEMPERATURE-COMPENSATION

RELATED APPLICATION

This application claims the benefit under 35 USC §119 of the co-pending application for "Heating-control isolation Diode Temperature Compensation", China App. No. 200620043996.5, filed Jul. 18, 2006.

FIELD OF THE INVENTION

This invention relates to heater control circuits, and more particularly to temperature-compensating circuits for sensorless heater control.

BACKGROUND OF THE INVENTION

A variety of consumer products include a heating element or heating body that is used to produce heat. The heating body has a positive temperature coefficient to allow for temperature control. Electronic products with a heating body are now widely used in people's daily life. Such products include a hair curler, a hair-straighter, an electric blanket, and many other kinds of products.

In these products, the heating body is both the heating element and the temperature sensor. The positive temperature coefficient allows the heating body itself to function as the temperature sensor, so an additional temperature sensor is not needed. These heating products that have a heating body that functions as both the heat generator and the temperature sensor are referred to as sensorless products. Sensorless products have many advantages, including a compact size and control structure, stable temperature performance, safety, and better robustness for daily use.

Older sensorless products may use a conventional temperature-measuring circuit. A conventional temperature-measuring circuit has a sampling circuit, a reference circuit, and a voltage comparator. To prevent damage to an integrated circuit (IC) from high voltages, a diode is inserted in series in the sampling circuit.

Unfortunately, the forward voltage drop of the diode creates an inaccuracy due to the temperature-drift characteristics of the diode. Conventional circuits generally ignore this error, which can cause an error in the temperature control. A technical problem is that the temperature-measuring result of the conventional method in sensorless products can vary with ambient temperature.

What is desired is to solve this temperature-control problem caused by the diode that prevents circuit damage caused by high voltages. It is desired to make accurate measurements without the effect of ambient temperature variation. A solution is desired that can be implemented by an integrated circuit with a compensation diode and a resistor. Compensation of measurement error for the full temperature range of the products is desirable.

DETAILED DESCRIPTION

The present invention relates to an improvement in temperature-compensating circuits for sensor-less heater control. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized the desirability of a solution to the technical problem of variation with ambient temperature of the temperature-measuring result of a sensorless heating product. The invention provides a solution to this problem.

The inventors' device includes a heating body with a positive temperature coefficient that acts as both the heating element and the temperature sensor. The device also includes a silicon-controlled rectifier (SCR), a sampling resistor, an isolation diode, a voltage comparator, a switch for a low voltage DC supply and a power supply. An integrated circuit that implements the inventors' device includes a first branch and a second branch.

The first branch includes a sampling resistor, an isolation diode, and a heating body in series. The second branch includes two reference resistors and a diode used for compensation, connected in series.

Figure 1:
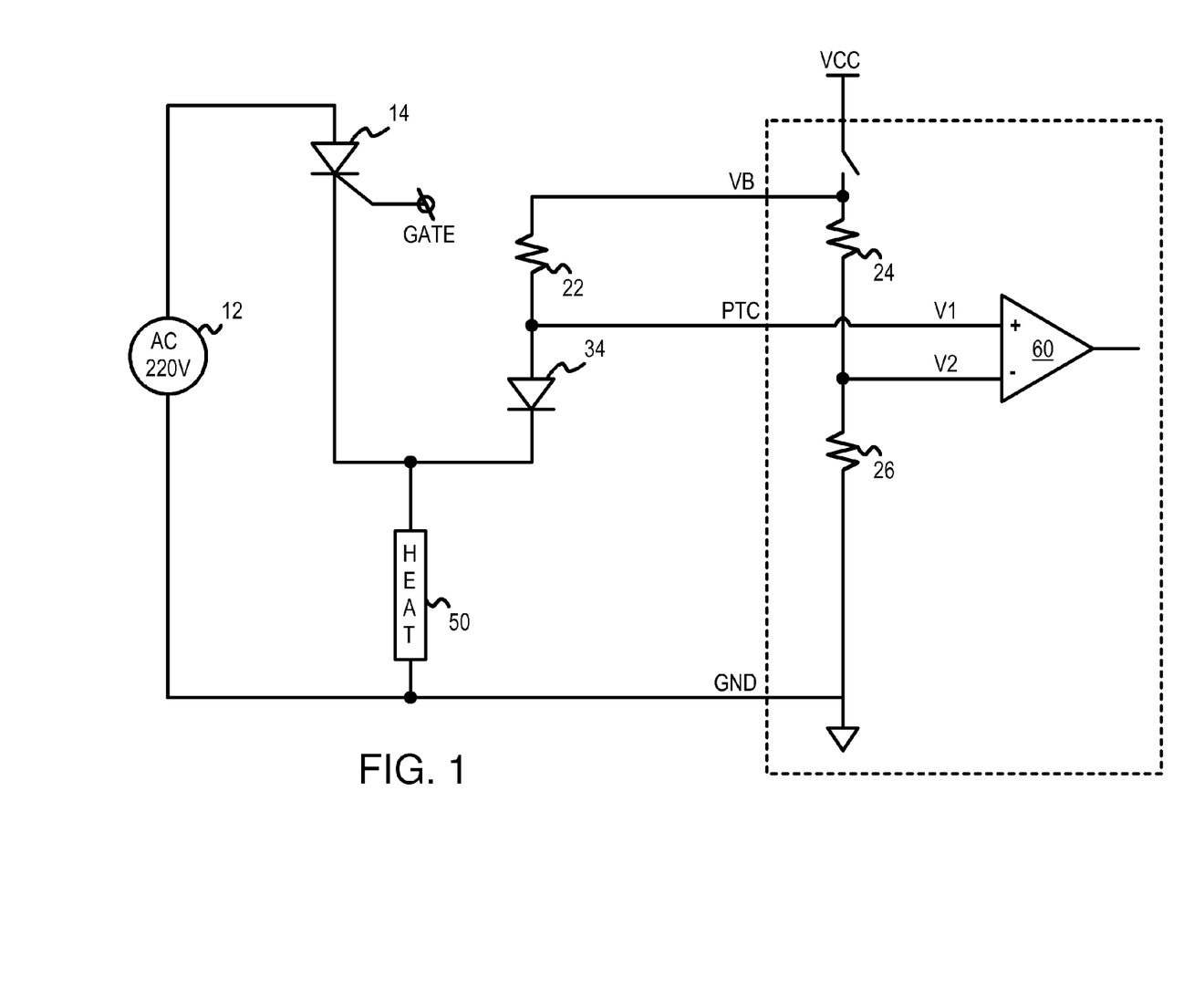
FIG. 1 highlights the shortcomings of a simple circuit.

FIG. 1 highlights the shortcomings of a simple circuit. A simple circuit includes heating body 50, SCR 14, sampling resistor 22, reference resistors 24, 26, isolation diode 34, voltage comparator 60, a low voltage DC supply switch, and power supply VCC. AC power supply 12 drives SCR 14 and heating body 50.

A sampling branch includes resistor 22, diode 34 and heating body 50 and produces sample voltage V1. A reference branch includes reference resistors 24, 26 and produced reference voltage V2. The temperature of heating body 50 can be measured by comparing sample voltage V1 and reference voltage V2.

The function of isolation diode 34 is to protect the low voltage circuit from damage by a high voltage. The forward voltage of isolation diode 34 is reduced when the ambient temperature rises, despite the inclusion of a sampling current. This results in a large temperature error when a large ambient temperature difference occurs, such as when heating body 50 is heated up and is much hotter than the ambient temperature.

In the equations below, VD1 is the voltage across isolation diode 34, RH is the resistance of heating body 50, RA is the resistance of resistor 22, RF1 and RF2 are the resistances of reference resistors 24, 26, respectively, and VCC is the DC power-supply voltage.

V1 and V2 are the + and − input voltages to comparator 60:

$$V1=(VCC-VD1)*RH/(RA+RH)+VD1$$

$$V2=VCC*RF2/(RF1+RF2)$$

When V1=V2, then $$(VCC-VD1)*RH/(RA+RH)+VD1=VCC*RF2/(RF1+RF2)$$

Rearranging the above equation:

$$RH=RA*(RF2/RF1)-RA*(1+(RF2/RF1))*(VD1/VCC)$$

This equation shows that the heating body resistance value (RH) is not only related to resistance RA of sampling resistor 22, but also to the ratio of reference resistors 24, 26 (RF1 to RF2). RH is also related to the ratio of VD1 (isolation diode 34) to VCC.

The inventors realize that this complex temperature dependence on isolation diode 34 and reference resistors 24, 26 is quite undesirable. Thus the simple circuit of FIG. 1 has undesirable temperature-tracking qualities.

Figure 2:
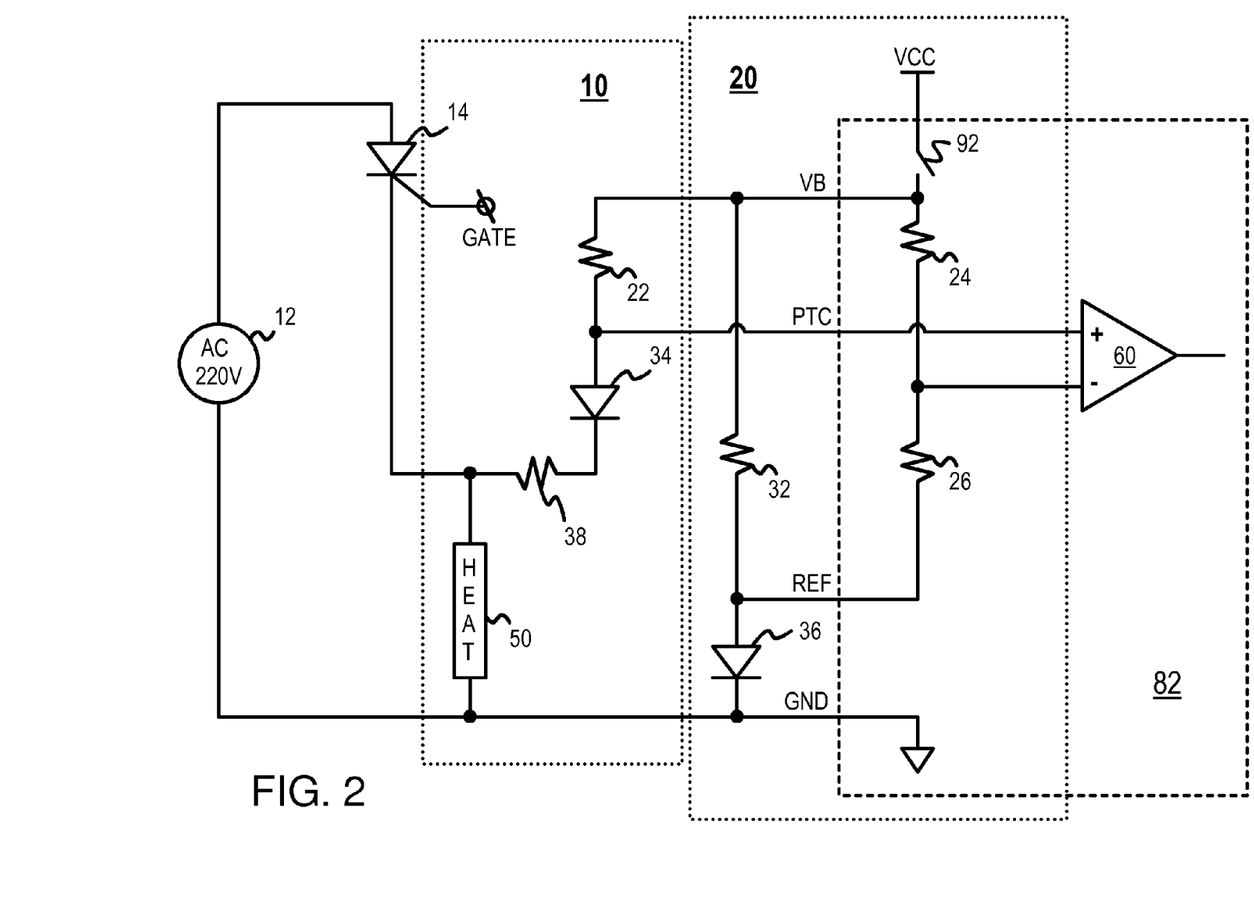
FIG. 2 is a schematic of an improved temperature-compensating circuit for a sensorless heating product.

FIG. 2 is a schematic of an improved temperature-compensating circuit for a sensorless heating product. The inventors' device includes heating body 50 which has a positive temperature coefficient, heating control SCR 14, sampling resistor 22, isolation diode 34, voltage comparator 60, AC power supply 12, and a low voltage supply switch for DC power supply VCC. An integrated circuit (IC) to implement the device may include components from first branch 10 and from second branch 20.

First branch 10 includes sampling resistor 22, isolation diode 34 and heating body 50, connected in series. Second branch 20 includes reference resistors 24, 26 and compensation diode 36, connected in series. Compensation resistor 32 connects in parallel with reference resistors 24, 26.

One terminal of heating body 50 in first branch 10 and the negative pole of compensation diode 36 in second branch 20 all connect to GND. Another terminal of sampling resistor 22 in first branch 10 connects to VCC through switch 92. Another terminal of reference resistor 24 in first branch 10 connects to VCC through switch 92. One input terminal (+) of comparator 60 connects to the positive terminal of isolation diode 34 and to sampling resistor 22, and another terminal (−) of comparator 60 connects to the node between to reference resistors 24, 26. The negative terminal of SCR 14 connects to heating body 50, and another terminal of SCR 14 connects to AC power supply 12.

Over a stated full-range of temperatures, the forward voltages of both isolation diode 34 and compensation diode 36 are the same.

Over this same full-range of temperatures, compensation resistor 32 acts as a rheostat. The resistance value of compensation resistor 32 is not equal to zero. Over this same full-range of temperatures, the voltages V1, V2 of the two input terminals of comparator 60 track each other.

There are two alternating periods of time during operation of the circuit. Heating body 50 heats up during a heating period of time, while temperature measurement using heating body 50 is performed during a temperature-measuring period of time.

Over the full-range of temperatures, SCR 14 conducts and isolation diode 34 shuts off during the heating time period. During the temperature-measuring time period that alternates with the heating time period, isolation diode 34 conducts while SCR 14 shuts off so that temperature measurement may occur.

Full-Range Temperature Compensation

The invention provides a compensation circuit that is based on the simple circuit of FIG. 1. The compensation circuit includes compensation resistor 32 and compensation diode 36 as shown in FIG. 2.

Compensation diode 36 can have the same part number as isolation diode 34. Thus diodes 36, 34 can have identical electrical characteristics and track each other over temperature. When the same forward current is passed through diodes 34, 36, the forward voltage of isolation diode 34 (VD1) and compensation diode 36 (VD2) are equal under any ambient temperature. In the meantime, the voltage divider ratio of reference resistors 24, 26 (the ratio of RF1 to RF2) stays constant.

During the temperature-measuring time period, the forward current conducted by isolation diode 34 and compensation diode 36 should be the same if the total resistance of second branch 20 is equal to the total resistance of first branch 10.

In the equations below, VD1 is the voltage across isolation diode 34, RH is the resistance of heating body 50, RA is the resistance of resistor 22, RF1 and RF2 are the resistances of reference resistors 24, 26, respectively, and VCC is the DC power-supply voltage. V1 and V2 are the + and − input voltages to comparator 60.

The resistances of compensation resistor 32 (RX) and of heating body 50 (RH) can be calculated from following:

$$RX*(RF1+RF2)/(RX+RF1+RF2)=RA+RH$$

$$RX=(RA+RH)*(RF1+RF2)/(RF1+RF2-RA-RH) \quad \text{(Eqn. 3)}$$

$$V1=(VCC-VD1)*RH/(RA+RH)+VD1$$

$$V2=(VCC-VD2)*RF2/(RF1+RF2)+VD2$$

$$V1=V2$$

$$(VCC-VD1)*RH/(RA+RH)=(VCC-VD2)*RF2/(RF1+RF2) \quad \text{(Eqn. 1)}$$

$$VD1=VD2 \quad \text{(Eqn. 2)}$$

Combining the above equations (1), (2), and (3) produces:

$$RH=RA*(RF2/RF1)$$

$$RX=RA*(RF1+RF2)/(RF1-RA)$$

The above equations show that the measured value of heating body 50 resistance (RH) should be related only to the resistance of sampling resistor 22 (RA) and the ratio of reference resistors 24, 26 (RF1 to RF2). RH not related to the ratio of VD1 (isolation diode 34) to VCC, as was the case of the simple circuit of FIG. 1. Thus temperature compensation is improved with the circuit of FIG. 2.

Structural Features of the Sensorless Product

The sensorless product does both heating and temperature measurement using heating body 50. Heating body 50 has a positive temperature coefficient. This means that the resistance RH of heating body 50 will continue to become larger as the temperature rises. This is the basis of the temperature-measuring device.

The temperature-measuring circuit converts the temperature-induced change in resistance value RH into voltage signal changes. The temperature change can be detected by comparing the sensing voltage on node PTC to the reference voltage V2.

Heating Control Circuit

Figure 3:
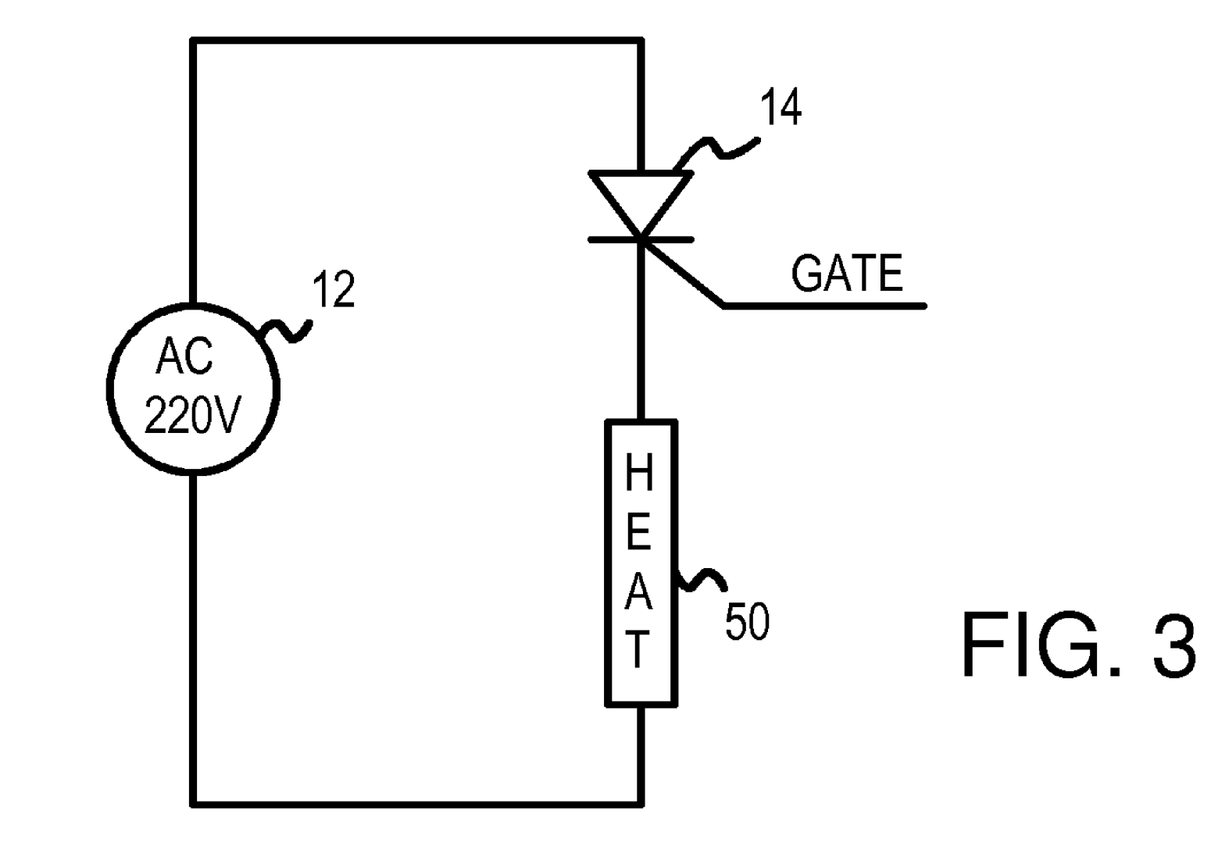
FIG. 3 show a heating control circuit.

FIG. 3 show a heating control circuit. The heating control circuit uses SCR 14 as a heating switch. When the gate of SCR 14 is driven with a trigger voltage or current, SCR 14 conducts current to heating body 50, causing heating body 50 to heat up. When the trigger signal is not applied to the gate of SCR 14, SCR 14 stops conducting, and heating body 50 stops heating. AC power supply 12 provides power to SCR 14 and to heating body 50 in a loop.

Temperature Measuring Circuit

Figure 4:
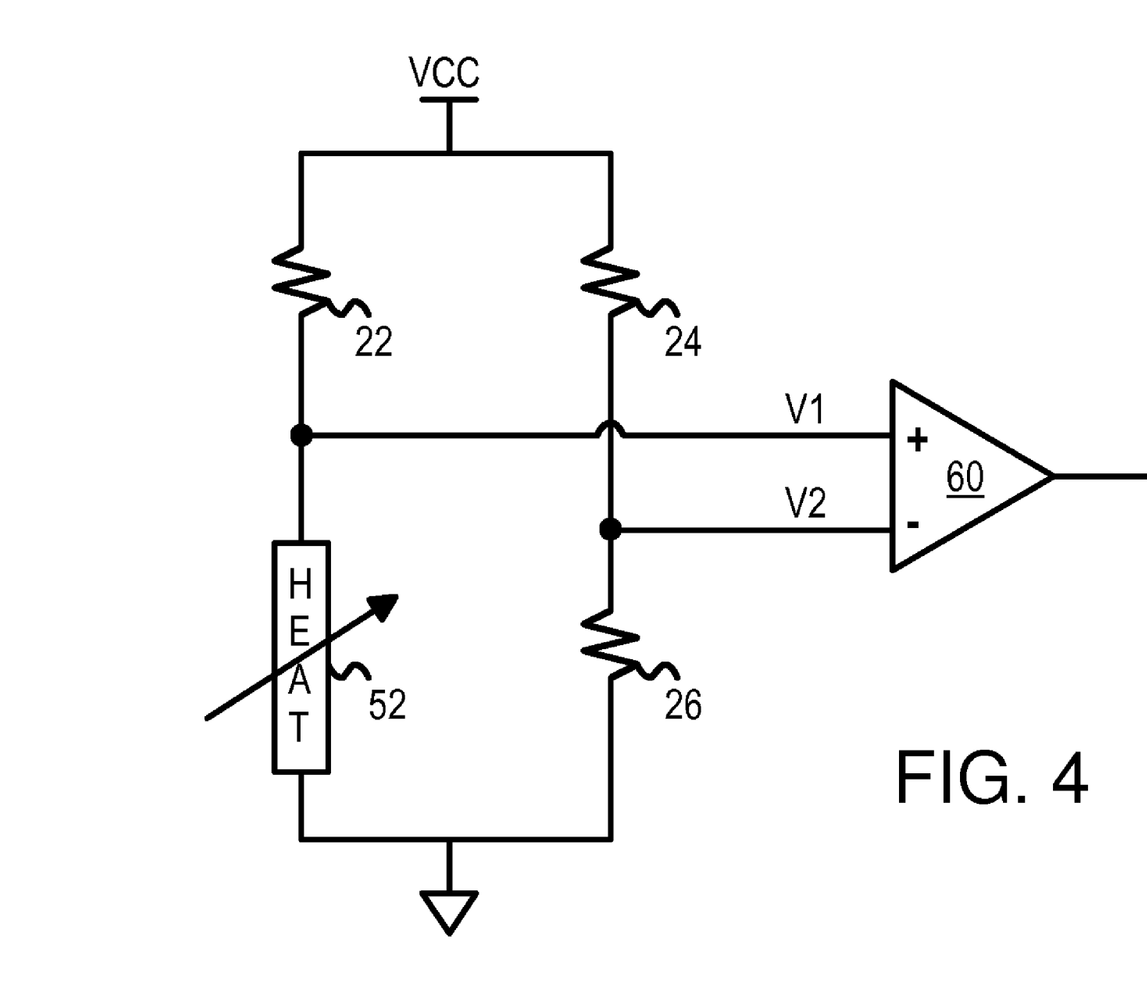
FIG. 4 shows a temperature measuring circuit.

FIG. 4 shows a temperature measuring circuit. The temperature measuring (test) circuit of FIG. 4 includes sampling resistor 22, heating body 52, reference resistors 24, 26, and comparator 60. The sampling circuit includes sampling resistor 22 and heating body 52. The reference circuit includes resistors reference resistors 24, 26.

When sampling voltage V1 is equal to reference voltage V2, the output of comparator 60 switches state, indicating that the temperature of heating body 50 has reached a preset temperature point.

In the equations below RA, RH, RF1, RF2 stand for resistance of sampling resistor 22, heating body 50, and reference resistors 24, 26, respectively. VCC, VD1, VD2 stand for the DC supply voltage, and the forward voltages of isolation diode 34 and compensation diode 36, respectively.

V1 and V2 are the + and − input voltages to comparator 60:

$$V1=VCC*RH/(RA+RH)$$

$$V2=VCC*RF2/(RF1+RF2)$$

When V1=V2:

$$VCC*RH/(RA+RH)=VCC*RF2/(RF1+RF2)$$

Rearranging:

$$RH=RA*(RF2/RF1)$$

From this equation, the heating body resistance value RH is only related to resistance RA of sampling resistor 22, and to the ratio of reference resistors 24, 26 (RF1 to RF2).

Heating and Measuring at Different Time Slots

There is a need to arrange the heating control and the temperature test in different time slots. The testing circuit is turned off when the heating control circuit is on, and the heating control circuit is turned off work when testing circuit is on. Temperature measurement should be performed after heating body 50 has stopped heating. While heating body 50 is being heated, isolation diode 34 remains shut-off due to the high voltage on its negative terminal.

Application of the Invention

When the isolation diode 34 is a different type than compensation diode 36, the rated diode working current can be obtained from the diode's electronic characteristics. The ratio of forward diode currents is the ratio n=I1/I2, where I1 is the current of isolation diode 34 and I2 is the current of compensation diode 36. VD1 is the forward voltage of isolation diode 34 and VD2 is the forward voltage of compensation diode 36. V1, V2 are the voltages of inputs to comparator 60.

The resistance value of compensation resistor 32, RX, is obtained from the working current ratio:

$$I1=(VCC-VD1)/(RA+RH)$$

$$I2=(VCC-VD2)/(RX*(RF1+RF2)/(RX+RF1+RF2))$$

$$I1/I2=n$$

$$V1=(VCC-VD1)*RH/(RA+RH)+VD1$$

$$V2=(VCC-VD2)*RF2/(RF1+RF2)+VD2$$

When V1=V2 and VD1=VD2:

$$(VCC-VD1)*RH/(RA+RH)=(VCC-VD2)*RF2/(RF1+RF2)$$

which leads to:

$$RH=RA*RF2/(RF1+RF2)$$

$$RX=n*RA*(RF1+RF2)/(RF1-n*RA)$$

Alternate Embodiments

Figure 5:
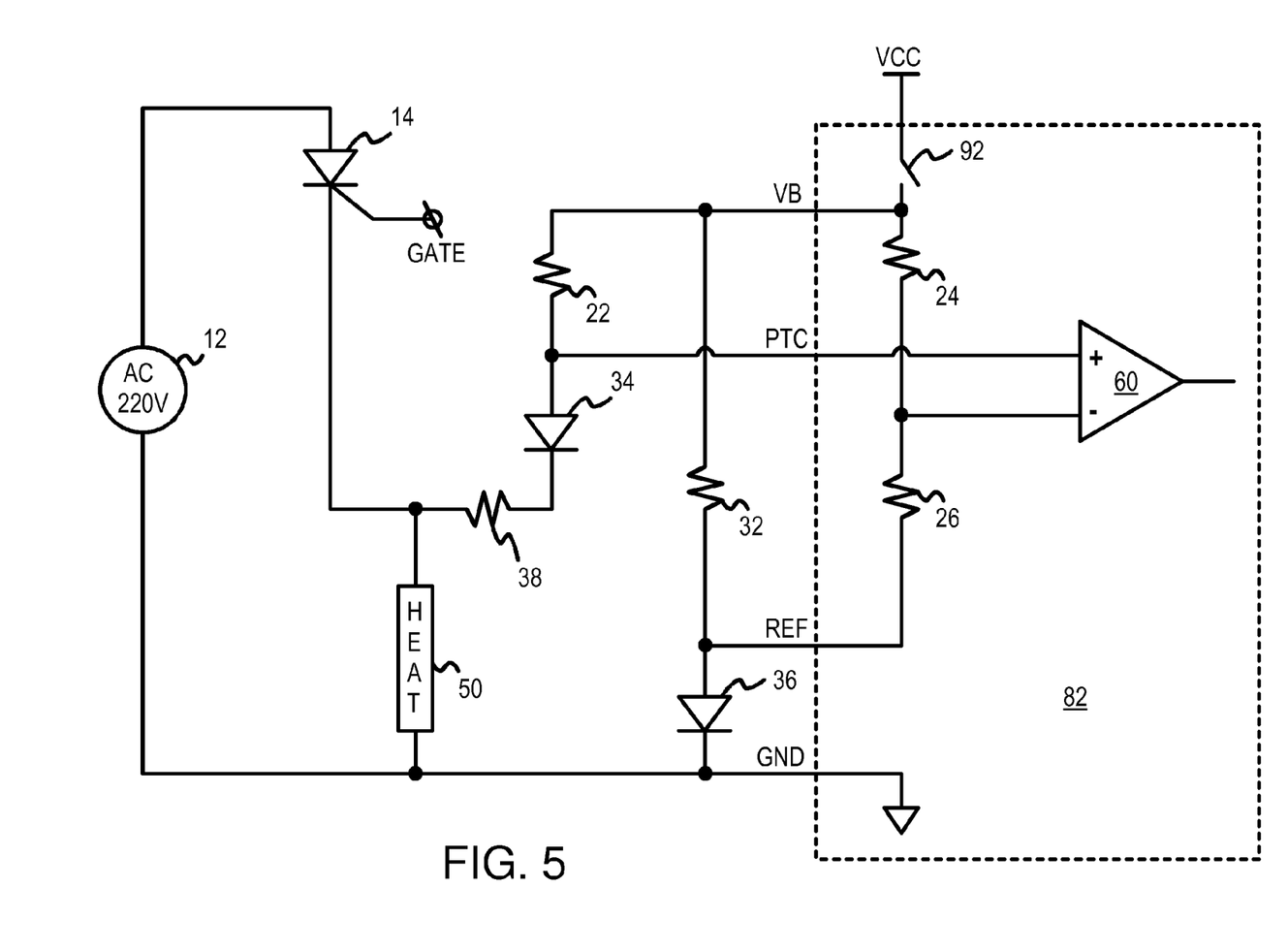
FIG. 5 shows an alternate embodiment of the improved temperature-compensating circuit for a sensorless heating product.
Figure 6:
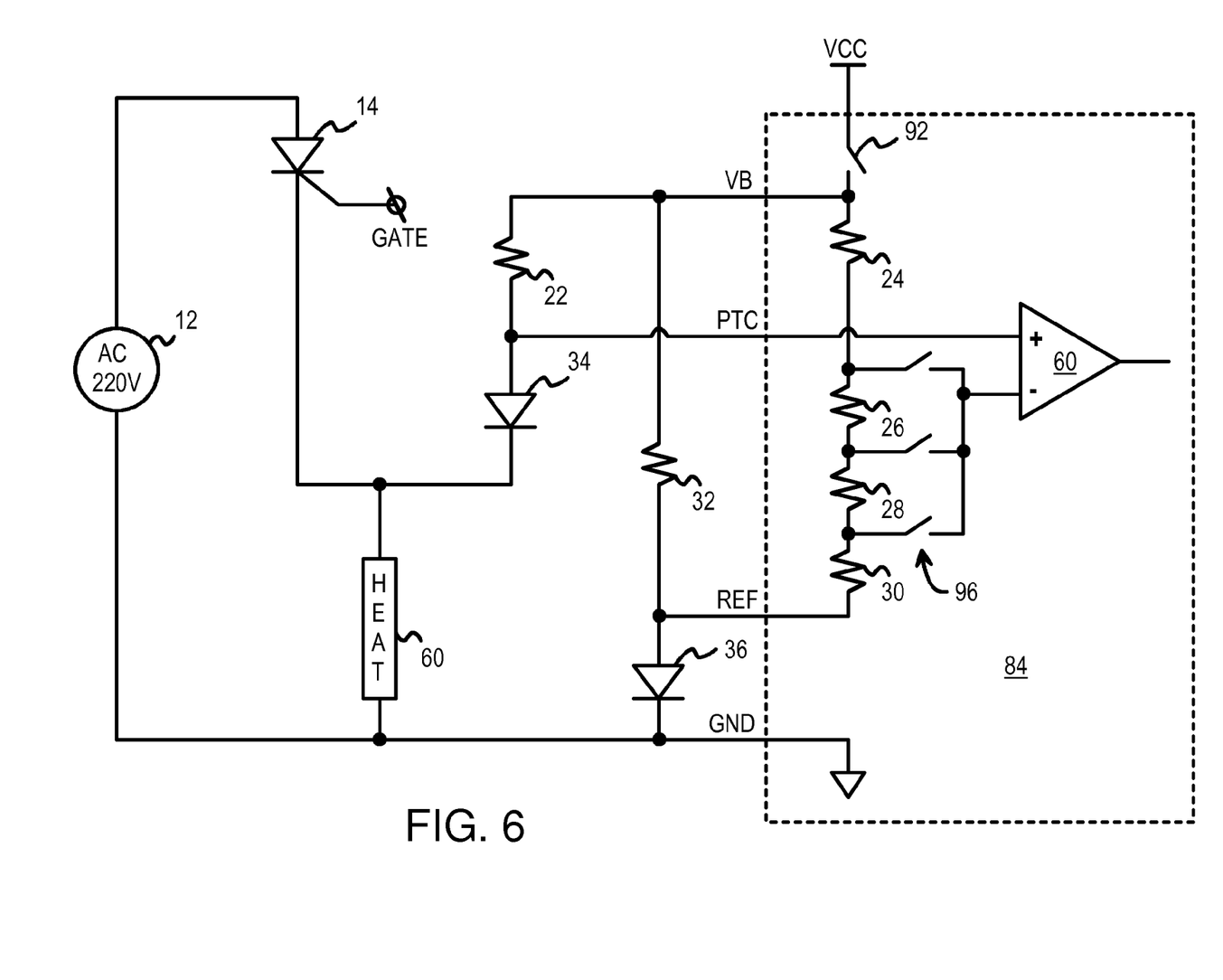
FIG. 6 shows an alternate embodiment with switches for preset temperature points for the improved temperature-compensating circuit for a sensorless heating product.

FIGS. 5, 6

FIG. 5 shows an alternate embodiment of the improved temperature-compensating circuit for a sensorless heating product. FIG. 5 is similar to FIG. 2 described earlier. In FIG. 5, series adapting resistor 38 is added in series between isolation diode 34 and heating body 50. The resistance value of series adapting resistor 38 can be chosen to adapt the circuit to a different temperature coefficient of heating body 50. The sensing current is further limited by series adapting resistor 38 to allow for adaptation of heating body 50.

FIG. 6 shows an alternate embodiment with switches for preset temperature points for the improved temperature-compensating circuit for a sensorless heating product. FIG. 6 is similar to FIG. 2 described earlier. However, in FIG. 6 two additional reference resistors 28, 30 are added in series with reference resistors 24, 26. The inverting (−) input to comparator 60 can be selected from one of the three intermediate nodes between reference resistors 24, 26, 28, 30 using switches 96.

The node between reference resistors 24, 26 has a higher voltage than the node between reference resistors 26, 28, which is still higher than the voltage on the node between reference resistors 28, 30. Thus one of three reference voltages can be selected by switches 96 to connect to comparator 60. The sensing voltage V1 on node PTC that is applied to the non-inverting (+) input of comparator 60 is compared to one of these three reference voltages selected by switches 96. Thus the temperature of heating body 50 can be compared to one of three temperatures that correspond to the three voltages selectable by switches 96.

Switches 96 and reference resistors 24, 26, 28, 30 allow for setting of different preset temperature points.

Alternate Embodiments

Several other embodiments are contemplated by the inventors. For example comparators can be implemented in a variety of ways such as voltage differential comparators or amplifiers with or without hysteresis, current differential comparators or amplifiers with or without hysteresis, etc. Other components such as capacitors, inductors, resistors, filters, etc. may be added at various points in the circuit.

Comparator 60 may be formed inside integrated circuit (IC) 82 of FIG. 2, 5, or IC 84 of FIG. 6. Comparator 60 and reference resistors 24, 26 may be integrated together on an integrated circuit (IC) that is separate from other components. Other components could be integrated with comparator 60, including some or all of sampling resistor 22, compensation resistor 32, isolation diode 34, and compensation diode 36. SCR 14 and heating body 50 may be larger-size components or could be integrated with comparator 60, especially when smaller heating loads were controlled by heating body 50, such as for micro-heating applications.

The background of the invention section and other sections may contain background information about the problem or environment of the invention rather than describe prior art by others. Thus inclusion of material in the background section and other sections is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A temperature-sensing circuit comprising:
   a comparator that receives a sensing voltage and a reference voltage and generates a compare output;
   a voltage divider between a power supply and a compensation node, the voltage divider generating the reference voltage applied to the comparator;
   a sensing branch that senses a sensing current through a heating body to generate the sensing voltage;
   an isolation diode in the sensing branch to protect the comparator from damage due to high voltages;
   a sampling resistor in the sensing branch, the sampling resistor limiting the sensing current;
   a compensation branch between the power supply and a ground;
   a compensation diode in the compensation branch, the compensation diode for compensating the sensing voltage applied to the comparator for a voltage drop through the isolation diode; and
   a compensation resistor in the compensation branch to supply current to the compensation diode;
   wherein the compensation node of the voltage divider is a terminal of the compensation diode,
   whereby the compensation diode adjusts the reference voltage applied to the comparator by the voltage divider to compensate for the voltage drop through the isolation diode.

2. The temperature-sensing circuit of claim 1 wherein the compensation diode is coupled between the compensation node and the ground;
   wherein the compensation resistor is coupled between the power supply and the compensation node.

3. The temperature-sensing circuit of claim 2 wherein the sampling resistor is coupled between the power supply and a sensing node having the sensing voltage;
   wherein the isolation diode is coupled between the sensing node and the heating body.

4. The temperature-sensing circuit of claim 2 wherein the sampling resistor is coupled between the power supply and a sensing node having the sensing voltage;
   wherein the isolation diode is coupled between the sensing node and the heating body;
   further comprising:
   a series adapting resistor in the sensing branch, coupled between the isolation diode and the heating body.

5. The temperature-sensing circuit of claim 2 further comprising:
   a series adapting resistor in the sensing branch, the series adapting resistor further limiting the sensing current to adapt to a resistance of the heating body.

6. The temperature-sensing circuit of claim 2 wherein the power supply further comprises a switch for disconnecting the power supply when the heating body is being heated, and for connecting the power supply to the sensing branch when the heating body is being sensed for temperature measurement.

7. The temperature-sensing circuit of claim 6 further comprising:
   the heating body;
   a heater power supply;
   a silicon-controlled rectifier (SCR) coupled between the heater power supply and the heating body, the SCR disconnecting the heater power supply from the heating body when the heating body is being sensed for temperature measurement.

8. A heating control circuit comprising:
   voltage compare means for comparing a sense voltage to a reference voltage to generate an output signal that indicates a temperature of a heating body that also acts as a temperature sensor;
   voltage divider means for generating the reference voltage from a power supply voltage;
   sampling resistor means for limiting a sensing current from the power supply voltage;
   isolation diode means for preventing back current flow from the heating body to the voltage compare means, the isolation diode means generating a rectifier voltage drop as the sensing current passes through the isolation diode means;
   wherein the sampling resistor means and the isolation diode means are connected in series between the power supply voltage and the heating body to generate the sense voltage;
   compensation resistor means for limiting a compensation current from the power supply voltage; and
   compensation diode means for generating a compensating voltage drop when the compensation current passes through the compensation diode means;
   wherein the compensation resistor means and the compensation diode means are connected in series, with a compensation node in between;
   wherein the voltage divider means is connected between the power supply voltage and the compensation node, wherein the reference voltage to the voltage compare means is compensated by the compensation diode means to compensate for the isolation diode means, whereby the rectifier voltage drop is compensated for.

9. The heating control circuit of claim 8 wherein the compensating voltage drop of the compensation diode means matches the rectifier voltage drop of the isolation diode means,
   whereby diode voltage drops are matched for compensation.

10. The heating control circuit of claim 9 further comprising:
    series adapting resistor means for further limiting the sensing current;

wherein the series adapting resistor means is in series with the isolation diode means and the compensation resistor means.

11. The heating control circuit of claim 9 further comprising:
silicon-controlled rectifier means for switching alternating current from an alternating current supply to the heating body, wherein the alternating current activates the heating body to increase in temperature.

12. The heating control circuit of claim 11 further comprising:
power switch means for switching off the power supply voltage when the silicon-controlled rectifier means switches the alternating current from an alternating current supply to the heating body to activate the heating body to increase in temperature,
wherein the sensing current is switched off when the alternating current is switched to the heating body.

13. A sensorless heating appliance comprising:
a heating body having a positive temperature coefficient;
a heater power supply;
a silicon-controlled rectifier (SCR) coupled between the heater power supply and the heating body, the SCR disconnecting the heater power supply from the heating body during a temperature-sensing time period;
a comparator for comparing a sensing voltage on a first input to a reference voltage on a second input to generate an output signal indicating a temperature of the heating body;
a sensing power supply;
a sampling resistor coupled to the sensing power supply and to the first input of the comparator;
an isolation diode coupled between the first input of the comparator and the heating body to supply a sensing current into the heating body during the temperature-sensing time period;
a compensation diode coupled between a compensation node and a ground; and
a compensation resistor coupled between the compensation node and the sensing power supply,
whereby the compensation diode compensates for a voltage drop through the isolation diode.

14. The sensorless heating appliance of claim 13 further comprising:
a first reference resistor coupled between the sensing power supply and the second input of the comparator;
a second reference resistor coupled between the second input of the comparator and the compensation node,
whereby the first and second reference resistors generate the reference voltage to the comparator.

15. The sensorless heating appliance of claim 13 further comprising:
a first reference resistor coupled between the sensing power supply and a first reference node;
a second reference resistor coupled between the first reference node and a second reference node;
a third reference resistor coupled between the second reference node and a third reference node;
a fourth reference resistor coupled between the third reference node and the compensation node;
a selector switch, coupled to the second input of the comparator, for selecting the first reference node, the second reference node, or the third reference node to generate the reference voltage to the comparator,
whereby reference voltages for temperature presets are selectable by the selector switch.

16. The sensorless heating appliance of claim 13 further comprising:
a series adapting resistor coupled between the isolation diode and the heating body.

17. The sensorless heating appliance of claim 13 wherein the sensing power supply is a direct current DC power supply having a lower voltage than the heater power supply.

18. The sensorless heating appliance of claim 17 wherein the heater power supply is an alternating current AC power supply.

19. The sensorless heating appliance of claim 18 further comprising:
a sensing power switch, coupled to the sensing power supply, to connect the sensing power supply to the sampling resistor during the temperature-sensing time period, and to disconnect the sensing power supply from the sampling resistor during a heating time period when the heater power supply is connected to the heating body by the SCR,
whereby the sensing power supply is disconnected from the heating body during the heating time period.

20. The sensorless heating appliance of claim 13 wherein compensation diode has a forward voltage that tracks a forward voltage of the isolation diode over a temperature range of the heating body.

* * * * *